United States Patent [19]
Scholl et al.

[11] Patent Number: 5,435,123
[45] Date of Patent: Jul. 25, 1995

[54] ENVIRONMENTALLY ACCEPTABLE ELECTRIC ENERGY GENERATION PROCESS AND PLANT

[75] Inventors: Gerhard Scholl, Speisen-Elversberg; Friedrich Bleif, Quierschied; Lothar Stadie, Höchstedt; Hans-Karl Petzel, Weinheim, all of Germany

[73] Assignee: Saarbergwerke Aktiengesellschaft, Saarbrücken, Germany

[21] Appl. No.: 142,339

[22] PCT Filed: May 21, 1992

[86] PCT No.: PCT/DE92/00413
§ 371 Date: Dec. 17, 1993
§ 102(e) Date: Dec. 17, 1993

[87] PCT Pub. No.: WO92/21859
PCT Pub. Date: Dec. 10, 1992

[30] Foreign Application Priority Data

May 25, 1991 [DE] Germany .................. 41 17 189.6
Sep. 24, 1991 [DE] Germany .................. 41 31 757.2

[51] Int. Cl.$^6$ ............................................. F02C 6/18
[52] U.S. Cl. ................. 60/39.05; 60/39.182; 60/39.52
[58] Field of Search ............... 60/39.05, 39.182, 39.51, 60/39.52, 39.02

[56] References Cited

U.S. PATENT DOCUMENTS

| | | | |
|---|---|---|---|
| 2,294,700 | 9/1942 | Stroehlen | 60/39.182 |
| 2,970,434 | 2/1961 | Warren | 60/39.182 |
| 3,203,175 | 8/1965 | Michalicka et al. | 60/39.182 |
| 3,657,879 | 4/1972 | Ewbank et al. | 60/39.05 |
| 3,703,807 | 11/1972 | Rice | 60/39.52 |

*Primary Examiner*—Louis J. Casaregola
*Attorney, Agent, or Firm*—James Creighton Wray

[57] ABSTRACT

A process is disclosed for generating electric energy in a combined gas/steam generating power station in an environmentally acceptable manner by the efficient expansion of a high-pressure working medium in a gas turbine (4) and of high-pressure overheated steam from a fossil fuel fired steam generator (30) in a steam turbine (11). The sensible heat of the efficiently expanded working medium from the gas turbine (4) is transmitted to the combustion air (14) of the steam generator and part (20) of the expanded and cooled working medium from the gas turbine (4) is mixed into the fresh air to be compressed in the gas turbine. The steam (25) taken from the steam generator (30) is further heated before being expanded in a heat exchanger (7) arranged in the heating chamber of an additional fluidized bed furnace (8). The flue gases from the fluidized bed furnace are introduced into the heating chamber of the steam generator.

7 Claims, 1 Drawing Sheet

ENVIRONMENTALLY ACCEPTABLE ELECTRIC ENERGY GENERATION PROCESS AND PLANT

BACKGROUND OF THE INVENTION

The invention relates to a process for the environmentally acceptable generation of electric energy in a combined gas/steam generating power plant by efficient expansion of a high-pressure working medium in a gas turbine and of high-pressure superheated steam of a fossil fuel fired steam generator in a gas turbine, as well as to a plant for performing the process.

In prior art processes for the combined generation of electric energy using gas and steam turbines, the compressed working gas generated in the oil or gas fired furnace chamber of the gas turbine is first efficiently expanded in the gas turbine at a temperature above 1,000° C., and the hot turbine gases that still exhibit an oxygen excess are utilized as combustion air for the steam generation furnace. Compared to power generating plants working solely with steam, combined gas/-steam generating power plants are characterized by improved efficiency and thus, related to output, lower $CO_2$ emissions. The oxygen excess of the gas turbine is attributed to the fact that the generation of the mass flux needed for the gas turbine requires an air volume that greatly exceeds the actual combustion air volume. Since the combustion takes place in the furnace chamber with an oxygen excess and at high temperatures, the waste gases of the gas turbine contain a high portion of nitric oxides, thus requiring a suitable design of the flue gas denitrification system of the steam generator.

But the waste gases of the gas turbine also have a lower $O_2$ content than fresh air. Compared to the use of fresh air for the steam generator furnace, this increases the waste gas or flue gas mass flux through the steam generator and following components, such as the electrostatic filter, upward draft, denitrification system, and flue gas desulfuration system by up to 50% for an identical steam generator output. This again increases the operating power consumption of the power plant system so that part of the improvement in efficiency resulting from the combination of gas turbine and steam generator furnace is again lost. In the case of melting chamber furnaces, an increase in the flue gas mass flux is in any case only possible to a limited extent, since one of the factors being influenced negatively is the melt flux in the furnace chamber. It is therefore not, nor only conditionally, possible to refit steam generating power plants with melting chamber furnaces.

It is thus the task of this invention to improve a process of the aforementioned type for generating electric energy in a combined gas/steam generating power plant so as to achieve both higher efficiency and thus reduce the specific $CO_2$ emission and to reduce the nitric oxide emissions.

SUMMARY OF THE INVENTION

According to the invention, this task is solved in that the sensible heat of the efficiently expanded working medium of the gas turbine is transferred to the combustion air of the steam generator.

The process of the invention makes it possible to use the heat content of the turbine waste gases without having to increase the flue gas mass flux through the steam generator and following components. The improvement in efficiency achieved with this combination thus remains fully usable. The process of the invention also makes it possible to refit existing systems equipped with melting chamber furnaces in a simple manner. The nitric oxide formation in the furnace chamber of the gas turbine can also be decreased significantly, if, according to a further characteristic of the invention, part of the efficiently expanded and cooled gas turbine medium, i.e. the gas turbine waste gas that is relatively poor in oxygen compared to fresh air, is mixed with the fresh air to be compressed and is recycled with the latter to the furnace chamber of the gas turbine. With this measure, part of the fresh air—which in one process according to the state of the art essentially was provided only as a mass flux for the gas turbine—is replaced by the oxygen-poor waste gas of the gas turbine so that the combustion in the furnace chamber is able to take place at a much lower level of oxygen excess. This again has the result that now almost no thermal nitric oxides are created any longer in the furnace chamber.

It is useful that the remainder of the non-recycled waste gas of the gas turbine is mixed with the flue gas of the steam generator and is, together with the latter, removed through a chimney or cooling tower. Since the gas turbine waste gases are now practically free of harmful substances, they can be mixed with the flue gas of the steam generator after the flue gas cleaning, so that they, due to their temperature of approximately 80° C., contribute to the increase in buoyancy of the flue gases. An additional increase in efficiency is achieved if, according to another characteristic of the invention, the steam removed from the steam generator is, prior to its expansion, heated further in a heat exchanger located in the furnace chamber of an additional fluidized bed furnace. The subsequent heating of the steam in an additional fluidized bed furnace can be performed, due to the better heat transition and uniform temperature in the fluidized bed, at lower furnace chamber temperatures than would be possible in the steam generator itself. The steam thus can be subsequently heated to higher steam temperatures and the block efficiency can be improved without resulting in material problems in regard to heat exchanger pipes through which high-pressure water steam flows.

It is advantageous that the flue gases of the fluidized bed furnace are introduced into the furnace chamber of the steam generator for further nitric oxide reduction. In addition to the nitric oxide reduction, the introduction of the flue gases of the fluidized bed furnace into the steam generator has the advantage that it is possible to use without any problem as a fuel for the fluidized bed, either alone or mixed with, for example, hard coal, waste materials that contain organic substances. Harmful substances potentially formed or carried in the flue gas are subsequently heated or burned in the furnace of the steam generator at temperatures above 1,000° C. and are destroyed again.

According to another characteristic of the invention, the gas turbine waste gases are cooled down to the range of the water dew point, whereby at least part of the water condensed from the gas turbine waste gases is recycled to the gas turbine system and is used as injection water.

The water injection both increases the gas turbine output and thus the efficiency, and also reduces the nitric oxide concentration of the turbine waste gases, whereby according to the invention the injection water is recovered from the gas turbine waste gas and is thus recycled.

The amount of the water portion condensed from the gas turbine waste gases that exceeds the injection water requirement and is essentially a result of the combustion of the hydrocarbon portions of the gas turbine fuel can be fed, for example, for the compensation of leakage losses, into the water/steam cycle of the steam generating power plant.

It is useful that the output portion of the gas turbine is not more than approximately 20% of the total system output. In this output range, the combustion air mass flux of the steam generator is distinctly higher than the mass flux of the gas turbine. This means that the gas turbine waste gases can be largely cooled to the water dew point range already during the heat exchange with the combustion air, and the need for additional cooling power is minimized or potentially completely eliminated.

A combined gas/steam generating power station for performing the process of the invention exhibits a gas turbine, a fossil fuel fired steam generator, and a gas turbine, and it is characterized by a regenerative heat exchanger that is integrated on the primary side into the waste gas duct for the expanded working medium of the gas turbine, and on the secondary side into the fresh air duct of the steam generator.

Another improvement in efficiency is achieved if a heat exchanger is provided in the furnace chamber of an additional fluidized bed furnace, the input of said heat exchanger being connected to the steam output of the steam generator and the output of said heat exchanger being connected to the steam input of the gas turbine. It is useful that a connecting duct for the flue gases of the fluidized bed furnace is provided between the fluidized bed furnace and the furnace chamber of the steam generator.

The following describes the process of the invention and a device according to the invention in more detail, utilizing the embodiments portrayed schematically in FIGS. 1 and 2.

DETAILED DESCRIPTION OF THE DRAWINGS

Figure 1:
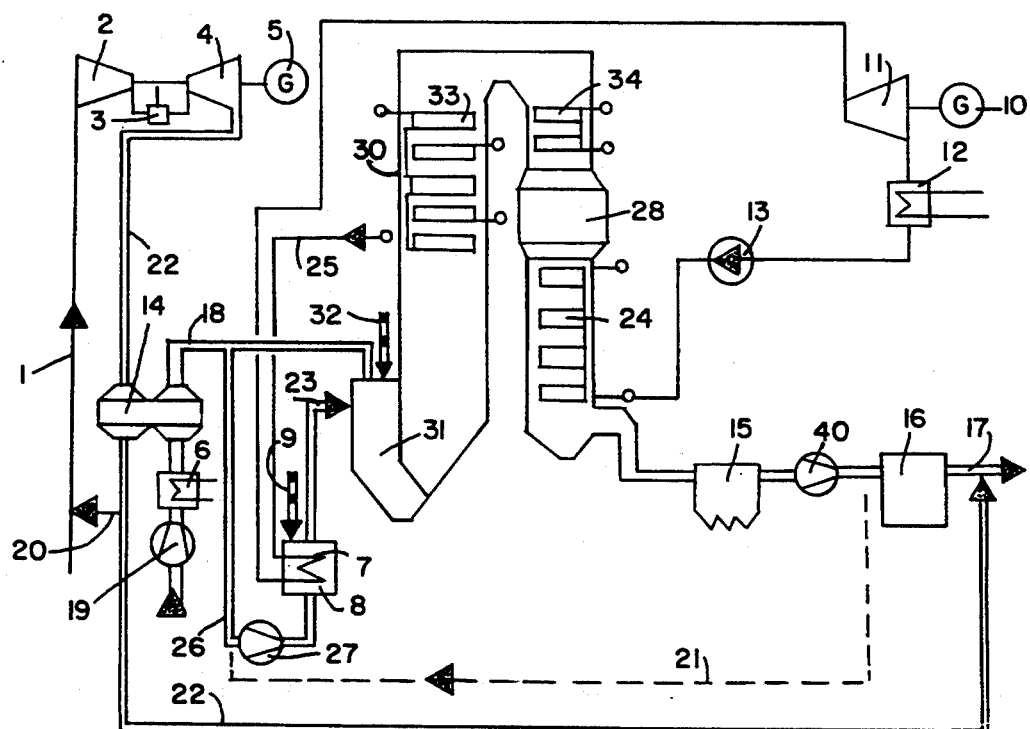
FIG. 1 shows schematically an embodiment of a combined gas/steam power plant.

In the embodiment of FIG. 1, fresh air supplied via duct 12 is compressed inside a compressor 2 to approximately 6–20 bar and is passed as combustion air into an oil- or gas-fired furnace chamber 3. The hot gas generated in the furnace chamber 3 is used as a working medium in a gas turbine 4 where it is efficiently expanded. The gas turbine 4 itself drives a generator 5 and the compressor 2.

The temperature of the expanded working medium that flows off via duct 22 is approximately 300°–600° C.

According to the invention, the residual heat of the expanded working medium of the gas turbine 4 that flows off in duct 22 is now transferred to the combustion air of a fossil fuel fired steam generator 30. For this reason, a heat exchanger 14, preferably—as also shown in the Figure—a regenerative heat exchanger, is connected both to duct 22 for the flowing-off working medium of the gas turbine 4, and to duct 18 for the combustion air of the steam generator 30. In this way it is possible to use the residual heat contained in the turbine waste gases for preheating the combustion air for the fossil fuel fired steam generator 30, without having to increase the flue gas mass flux through the steam generator 30 and following components. In particular, the procedure according to the invention makes it possible to utilize the advantages of a combined gas/steam generating power station even in the case, as shown in the drawn embodiment, of existing systems equipped with melting chamber furnaces, by simply having them preceded by the gas turbine cycle, since in a melting chamber furnace the increase of the flue gas mass flux, i.e. the passage of the entire turbine waste gases, is not possible due to the negative influence on the melting flux in the furnace 31.

According to another characteristic of the invention, the nitric oxide in the gas turbine waste gases is reduced by continuously mixing, via duct 20, a partial stream of the gas turbine waste gas that flows off via duct 22 and has been expanded and cooled in the heat exchanger 14 to approximately 40°–80° C. with the fresh air for the gas turbine 4 and by returning it together with the latter to the furnace chamber 3. The amount of the recycled waste gas partial stream hereby depends on the mass flux needed for an optimum performance of the gas turbine 4 and may account for up to 50% of the overall waste gas amount. With an optimum design, only the fresh air amount needed for combustion in furnace chamber 3 is then added, and the additional amount needed as mass flux for the gas turbine 4 is provided in the form of recycled, oxygen-poor waste gas. This makes it possible that the combustion in furnace chamber 3 takes place with a much lower oxygen excess, resulting in a formation of thermal nitric oxides that approaches zero.

The non-recycled part of the turbine waste gases is further removed via duct 22 and is preferably mixed with the flue gas of the steam generator 30 that usually has undergone wet cleaning, and is discharged together with the latter via a chimney or cooling tower into the atmosphere. As a result of its residual heat, the gas turbine waste gas contributes to the increase in buoyancy of the total flue gas volume.

In the steam generator 30, i.e. in the drawn embodiment a melting chamber boiler with furnace chamber 31 and fuel charger 32, the high-pressure steam for the water/steam cycle is generated in heating surfaces 33, 34. This water/steam cycle has, in addition to heating surfaces 33, 34, as additional main components a steam turbine 11 with a generator 10, a steam condenser 12 and feed water pump 13, and another heat exchanger 24 for the preheating of the feed water. According to another characteristic, the steam generated in the steam generator 30 is passed, following the heating surfaces 33 via duct 25 over another heat exchanger 7. This heat exchanger 7 is located in an additional fluidized bed furnace 78 with fuel charger 9. In the heat exchanger 7, the steam is further heated to a temperature of approximately 560°–600° C. and is only then passed to the steam turbine 11 and expanded.

Since the superheating of the water steam in the heat exchanger 7 or in the fluidized bed furnace 8 can now take place at combustion chamber temperatures that are lower than those of the steam generator 30 and with uniform temperature distribution, the material problems for the heat exchanger pipes that otherwise exist due to the simultaneous presence of high pressure and non-uniform furnace chamber temperatures are avoided. It was found that this further superheating of the water steam in the fluidized bed furnace 8 to higher steam temperatures, the steam turbine 11 performance can be increased by up to 5–10%.

The combustion air needed in the fluidized bed furnace 8 is branched off behind the heat exchanger 14 via duct 28 and fan 27 from the fresh air for the steam generator 30 flowing in duct 18. The flue gases of the fluidized bed furnace 8 are passed via duct 23 into furnace chamber 31 of the steam generator 30 and thus contribute to reducing the nitric oxide in the steam generator 30.

The flue gas flowing off the steam generator 30 passes consecutively through an electrostatic filter 15, an upward draft fan 28, and a desulfuration system 16, and is then discharged via duct 17, into which also duct 22 for the turbine waste gases merges, via a chimney or cooling tower into the atmosphere. The nitric oxides can be reduced yet even further if, similar to the gas turbine 4, part of the cleaned flue gas stream of the steam generator 30 is returned via duct 21 into the fluidized bed furnace 8. It is possible that a denitrification system 28 is provided additionally before the heat exchanger 24.

It is possible that additional heat can be supplied to the compressed fresh air supplied by the fan 19 via heat exchanger 6 that is drawn inside duct 18 for the combustion air of the steam generator 30 upstream from heat exchanger 14. This heat exchanger 6 thus functions as a control element for compensating changes in the performance of the gas turbine 4 or for the additional preheating of the combustion air if the gas turbine 4 operates at partial or low capacity.

Figure 2:
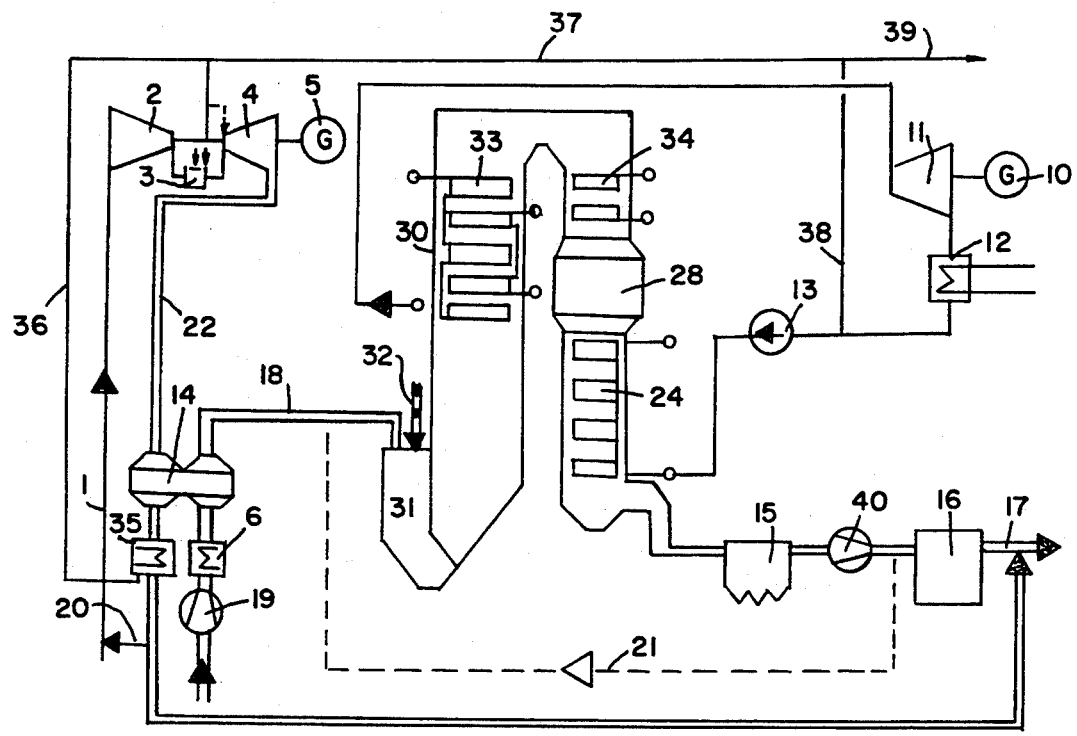
FIG. 2 shows all embodiment with the heat exchanger in the furnace chamber.

In the example of FIG. 2, the gas turbine waste gases are cooled to the range of the water dew point and the condensed water is recycled via duct 36 in order to increase the gas turbine performance and reduce the nitric oxide formation and is injected into the furnace chamber 3 or at a different, suitable point into the high-pressure working medium of the gas turbine 4.

As a rule, the cooling of the gas turbine waste gases to the range of the water dew point can take place in one step, i.e. directly in heat exchanger 14 in heat exchange with the combustion air of steam generator 30. This presupposes, however, that the ratio of combustion air mass flux to gas turbine waste gas stream is sufficiently large. This is ensured in any case if the performance of the gas turbine system is not higher than approximately 20% of the performance of the total system.

However, if the ratio of combustion air mass flux to gas turbine waste gas mass flux is not sufficiently great for cooling the gas turbine waste gases exclusively in heat exchange with the combustion air until the dew point range is reached, the cooling of the gas turbine waste gases must be accomplished in two steps, i.e. the residual cooling to the dew point range must take place in a subsequent additional cooler 35. The additional cooler 35 for the residual cooling of the gas turbine waste gases then also requires a separate cooling medium, for example, cooling water from the cooling cycle of the steam generating power station.

In addition to the portion corresponding to the water volume injected into furnace chamber 3 or the working medium of the gas turbine 4, a water portion resulting from the combustion of the hydrocarbons contained in the gas turbine fuel is created. The excess water portion can be fed via ducts 37, 38 into the water/steam cycle of the steam generating power station, preferably before the feed water pump 13, in place of fresh water for compensating leakage losses and/or can be fed via duct 39, potentially following treatment, into an industrial water supply.

We claim:

1. A process for the production of electric energy in a combined gas-steam power facility by efficient expansion of a high-pressure working substance which is heated in a gas turbine combustor fueled by fossil fuel in a gas turbine and of high-pressure overheated steam from a steam generator which is fueled by a solid fuel in a steam turbine, characterized by the fact that the perceptible heat of the efficiently expanded working substances of the gas turbine is transferred through indirect heat exchange between the released working substance of the gas turbine and the combustion air of the steam generator to the combustion air, and that the working substance of the gas turbine, which is cooled down in the process, is mixed with the flue gas of the steam generator after it is cleaned and cooled.

2. Process as claimed in claim 1, characterized in that part of the expanded and cooled working medium of the gas turbine is mixed with the fresh air of the gas turbine to be compressed.

3. A process for the production of electric energy in a combined gas-steam power facility by efficient expansion of a high-pressure working substance which is heated in a gas turbine combustor fueled by fossil fuel in a gas turbine and of high-pressure overheated steam from a steam generator which is fueled by a solid fuel in a steam turbine, characterized by the fact that the perceptible heat of the efficiently expanded working substances of the gas turbine is transferred through indirect heat exchange between the released working substance of the gas turbine and the combustion air of the steam generator to the combustion air, and that the working substance of the gas turbine, which is cooled down in the process, is mixed with the flue gas of the steam generator after it is cleaned and cooled, characterized in that the steam removed from the steam generator is, prior to its expansion, heated further in a heat exchanger located in the furnace chamber of a fluidized bed furnace.

4. Process as claimed in claim 3, characterized in that the flue gases of the fluidized bed furnace are introduced into the furnace chamber of the steam generator.

5. A process for the production of electric energy in a combined gas-steam power facility by efficient expansion of a high-pressure working substance which is heated in a gas turbine combustor fueled by fossil fuel in a gas turbine and of high-pressure overheated steam from a steam generator which is fueled by a solid fuel in a steam turbine, characterized by the fact that the perceptible heat of the efficiently expanded working substances of the gas turbine is transferred through indirect heat exchange between the released working substance of the gas turbine and the combustion air of the steam generator to the combustion air, and that the working substance of the gas turbine, which is cooled down in the process, is mixed with the flue gas of the steam generator after it is cleaned and cooled, characterized in that the ratio of gas turbine output to the total output of the gas/steam generating power station=0.2.

6. A combined gas/steam generating power plant for an efficient expansion of a high-pressure working substance and of high-pressure overheated steam comprising a gas turbine, a fossil fuel fired Steam generator, and a steam turbine, characterized by a regenerative heat exchanger (14) integrated on the primary side into the waste gas duct (22) for the expanded working medium of the gas turbine (4), and on the secondary side into the fresh air duct (18) of the steam generator (30), characterized by a heat exchanger (7) provided in the furnace chamber of a fluidized bed furnace (8), the input of said heat exchanger being connected to the steam output of the steam generator (30) and the output of said heat exchanger being connected to the steam generator (30).

7. Combined gas/stem generating power station as claimed in claim 6, characterized by a connecting duct (23) for the flue gases of the fluidized bed furnace (8) provided between the fluidized bed furnace (8) and the furnace chamber (31) of the steam generator (30).

* * * * *